(12) United States Patent
Ooi

(10) Patent No.: US 8,131,921 B2
(45) Date of Patent: Mar. 6, 2012

(54) COMMAND SUSPENSION IN RESPONSE, AT LEAST IN PART, TO DETECTED ACCELERATION AND/OR ORIENTATION CHANGE

(75) Inventor: Eng Hun Ooi, Penang (MY)

(73) Assignee: Intel Corporation, Santa Clara, CA (US)

( * ) Notice: Subject to any disclaimer, the term of this patent is extended or adjusted under 35 U.S.C. 154(b) by 768 days.

(21) Appl. No.: 12/212,384

(22) Filed: Sep. 17, 2008

(65) Prior Publication Data

US 2010/0067133 A1 Mar. 18, 2010

(51) Int. Cl.
*G06F 13/12* (2006.01)

(52) U.S. Cl. ........................................................ 711/112

(58) Field of Classification Search .................. None
See application file for complete search history.

(56) References Cited

U.S. PATENT DOCUMENTS 5,717,952 A * 2/1998 Christiansen et al. .......... 710/22

OTHER PUBLICATIONS

Serail ATA—NCQ Unload for Revsion 2.6, Serial ATA Internationa Organization, Jan. 10, 2006.*
Serial ATA Native Command Queueing, Intel and Seagate, Jul. 2003.*
AT Attachement with packet Interface—7, T13 Project 1532D vol. 1, Apr. 2004.*
AT Attachement with packet Interface—7, T13 Project 1532D vol. 3, Apr. 2004.*
"Proposed Draft Serial ATA International Organization", Revision 1.ORC2, (Dec. 15, 2006), 602 pgs.
"The Active Protection System", Article Discussion View Source History, http://www.thinkwiki.org/wiki/Active_Protection_System, 5 pgs, Aug. 6, 2008.
"Serial ATA Advanced Host Controller Interface (AHCI).3", Serial ATA AHCI 1.3 Specification Draft, 130 pgs, Jun. 1, 2008 specification p. 4.
"IBM Active Protection System Whitepaper", First Edition, (Oct. 2003),10 pgs.

* cited by examiner

*Primary Examiner* — Duc Doan
(74) *Attorney, Agent, or Firm* — Christopher K. Gagne

(57) ABSTRACT

In an embodiment, an apparatus is provided that may include circuitry to, in response at least in part to detected change in at least one of acceleration and orientation of storage, request suspension of at least one command currently stored in at least one pending command queue that is intended for execution, at least in part, by the storage. The at least one command having been previously issued by the circuitry but being currently unexecuted, at least in part, by the storage. The circuitry also being to store, in response at least in part to the detected change, at least one copy of the at least one command for later re-issuance by the circuitry, and to request replacement of at least one command in the at least one queue with at least one other command to park at least one head of the storage.

15 Claims, 3 Drawing Sheets

COMMAND SUSPENSION IN RESPONSE, AT LEAST IN PART, TO DETECTED ACCELERATION AND/OR ORIENTATION CHANGE

FIELD

This disclosure relates to command suspension in response, at least in part, to detected acceleration and/or orientation change.

BACKGROUND

In one conventional storage arrangement, a computer system includes a hard drive. The computer system is able to detect elevated levels of shock that might present a threat of damage to the hard drive. In the event that such elevated levels of shock are detected, the computer system requests that the hard drive's read/write heads move to locations at which the risks of shock damage to the heads (or other internal components of hard drive) or data loss are reduced.

However, prior to issuing the request, one or more commands previously issued to the hard drive by the computer system may be in the midst of execution. In one conventional technique, after detecting the elevated levels of shock, the computer system waits until after all of these commands have been completely executed by the hard drive before requesting that the heads be moved to the reduced risk locations. Alternatively, in another conventional technique, after detecting the elevated levels of shock, the computer system issues a software reset command to the hard drive and thereafter issues the request that the heads be moved to the lower risk locations. In order to maximize the chance that hard drive damage and data loss are prevented after occurrence of the shock, it is desirable to move the heads to the reduced risk locations within a relatively short time period. Unfortunately, in these conventional techniques, the time needed to complete execution of all of the commands, or the time needed to reset the hard drive following the issuance of the hard drive software reset command, may be undesirably large. This may result in the heads not being moved within this relatively short time period, and thereby, also may result in the damage to the heads, other hard drive components, and/or data loss.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
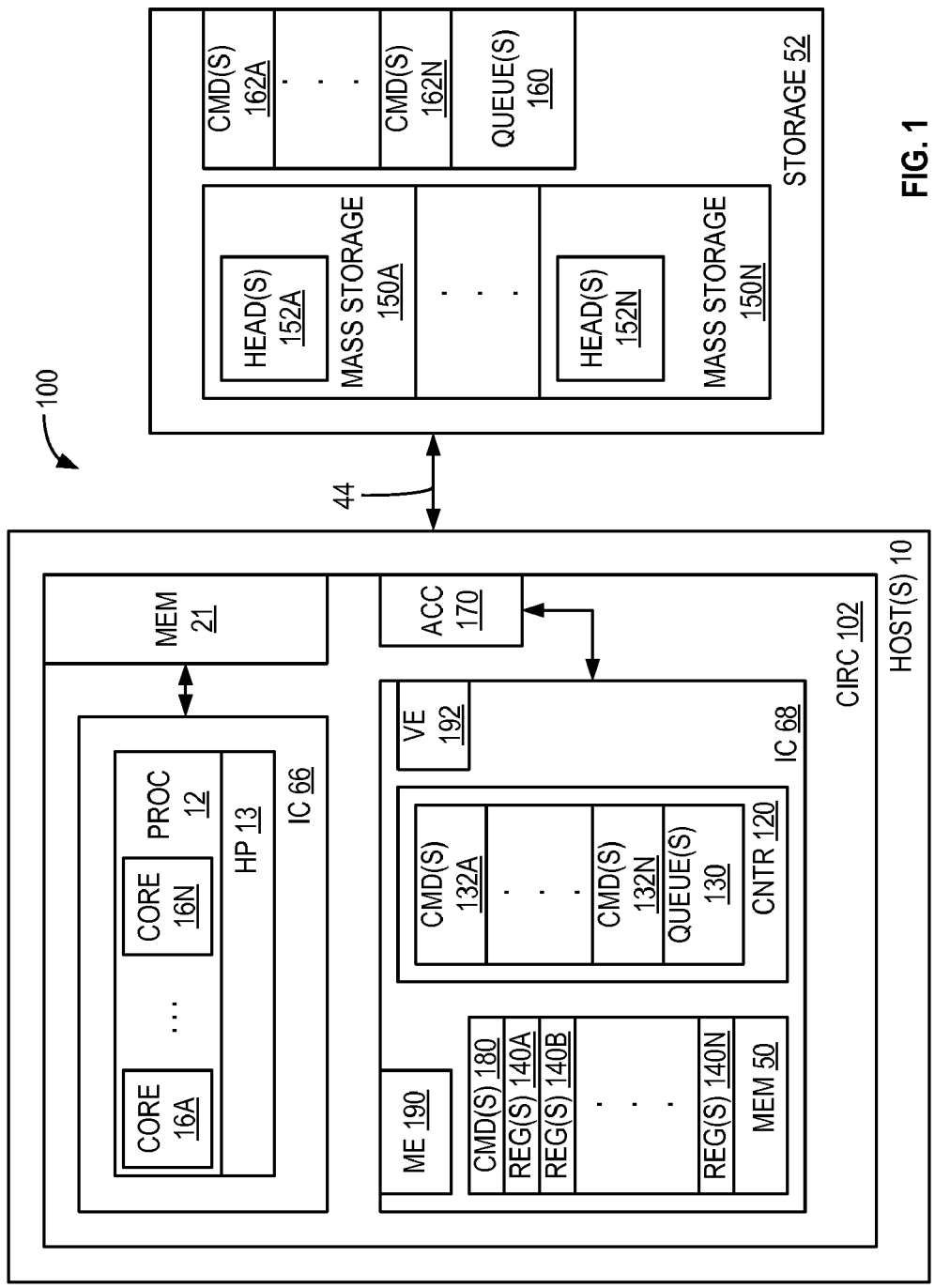
FIG. 1 illustrates a system embodiment.

FIG. 1 illustrates a system embodiment 100. System 100 includes at least one host 10 that is communicatively coupled to storage 52 via one or more communication links 44.

In system 100, at least one host 10 may comprise operative circuitry 102 that may be comprised in a not shown circuit board (e.g., a system motherboard). Circuitry 102 may comprise integrated circuit (IC) 66, machine-readable memory 21, IC 68, and accelerometer 170. Alternatively or additionally, accelerometer 170 may be comprised in storage 52. Although not shown in the Figures, IC 66 may comprise a graphics and memory controller hub that may couple together one or more host processors 13, memory 21, IC 68, and one or more not shown graphical user interfaces (e.g., comprising one or more graphical/video display devices, one or more pointing devices, one or more keyboard devices, and/or other and/or additional human user data/command input/output devices).

In this embodiment, one or more host processors 13 may comprise one or more processors 12. One or more processors 12 may comprise one or more (and in this embodiment, a plurality of) processor cores 16A ... 16N.

IC 68 may be communicatively coupled to accelerometer 170. IC 68 may comprise micro-engine (ME) 190, virtualization engine (VE) 192, machine-readable memory 50, and storage controller 120. As used herein, "circuitry" may comprise, for example, singly or in any combination, analog circuitry, digital circuitry, hardwired circuitry, programmable circuitry, state machine circuitry, and/or memory that may comprise program instructions that may be executed by programmable circuitry. Additionally, as used herein, first device may be "communicatively coupled" to a second device if the first device is capable of transmitting to and/or receiving from the second device one or more signals. "Memory" may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writeable memory. As used herein, an "integrated circuit" means a semiconductor device and/or microelectronic device, such as, for example, may be comprised within a semiconductor integrated circuit chip.

Machine-readable program instructions and/or related data may be stored in computer-readable memory 50, 21, and/or other computer-readable memory (not shown) that may be comprised in IC 66, IC 68, circuitry 102, and/or one or more hosts 10. These one or more instructions may be accessed and executed by IC 66, one or more processors 13, one or more processors 12, one or more cores 16A ... 16N, IC 68, circuitry 102, controller 120, ME 190, and/or VE 192. When these one or more instructions are so accessed and executed, this may result in IC 66, one or more processors 13, one or more processors 12, one or more cores 16A ... 16N, IC 68, circuitry 102, controller 120, ME 190, and/or VE 192 and/or other components of system 100, performing the operations described herein as being performed by IC 66, one or more processors 13, one or more processors 12, one or more cores 16A ... 16N, IC 68, circuitry 102, controller 120, ME 190, and/or VE 192 and/or these other components of system 100.

As used herein, the term "storage" may mean one or more apparatus into, and/or from which, data may be stored and/or retrieved, respectively. Also, as used herein, the terms "mass storage" and "mass storage device" may be used interchangeably to mean storage capable of non-volatile storage of data. For example, in this embodiment, mass storage may include, without limitation, one or more non-volatile electro-mechanical, magnetic, optical, and/or semiconductor storage devices.

As shown in FIG. 1, storage 52 may comprise one or more mass storage devices 150A . . . 150N. Each of the one or more mass storage devices 150A . . . 150N may comprise a respective hard disk device (not shown) having one or more respective platters (not shown) to which and/or from which data may be written and/or read via one or more respective read/write heads 152A . . . 152N.

Communication links 44 may be compatible with one or more communication protocols, and circuitry 102 may exchange data and/or commands with storage 52 via links 4, in accordance with these one or more communication protocols. For example, in this embodiment, one or more links 44 may be compatible with, and the respective operative circuitry 102 may exchange data and/or commands with storage 52 in accordance with, e.g., Serial Advanced Technology Attachment (S-ATA) protocol and/or S-ATA Advanced Host Controller Interface (AHCI) protocol. The S-ATA protocol that may be utilized in system 100 may be compatible with the protocol described in "Serial ATA: High Speed Serialized AT Attachment," Revision 1.0, published on Aug. 29, 2001 by the Serial ATA Working Group. The S-ATA AHCI protocol that may be utilized in system 100 may be compatible with the protocol described in the Serial Advanced Technology Attachment Advanced Host Controller Interface Specification, version 1.3, published by Intel Corporation on Jun. 1, 2008. Of course, many different communication protocols may be used for such data and/or command exchange without departing from this embodiment.

Figure 3:
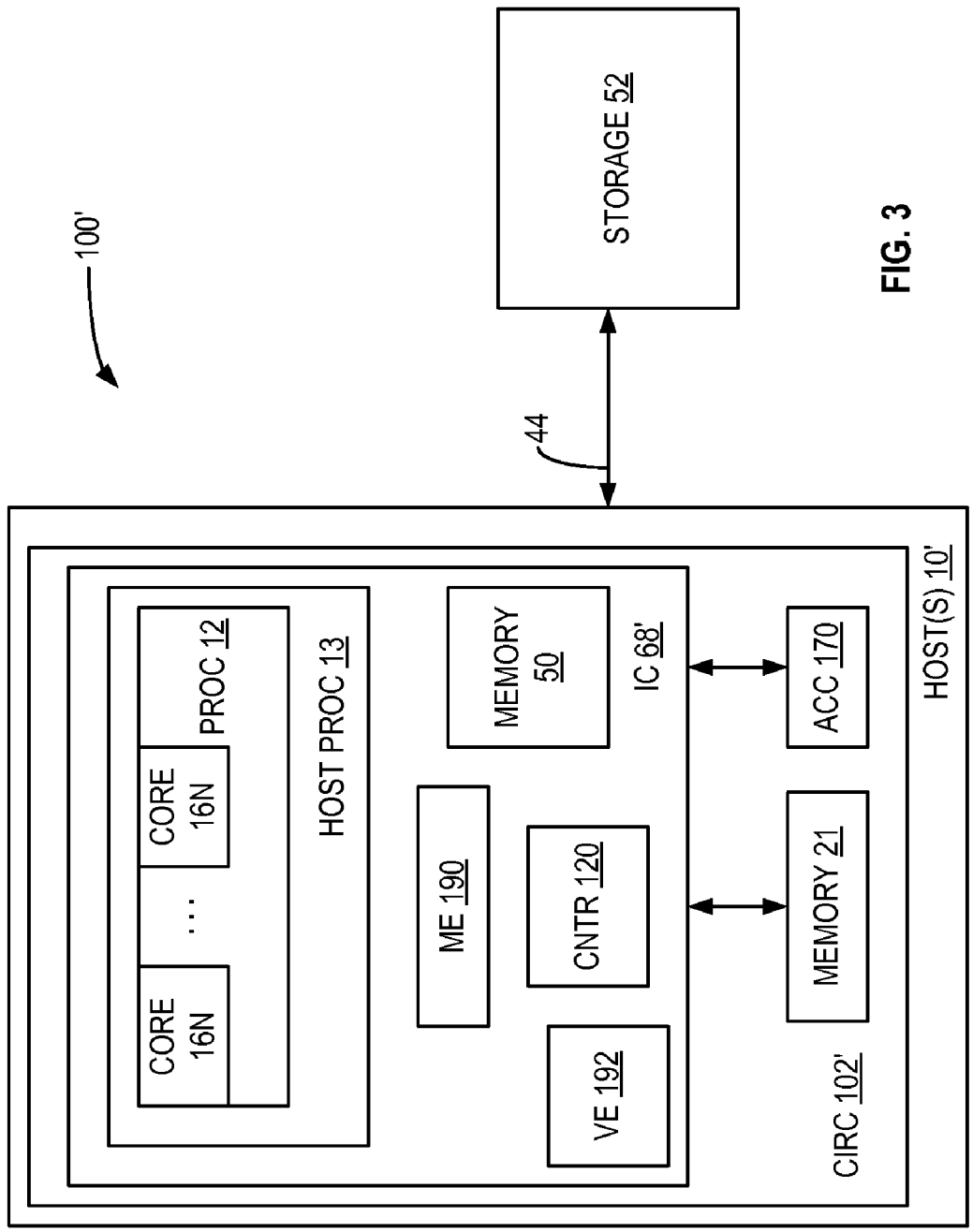
FIG. 3 illustrates another system embodiment.

FIG. 3 illustrates another system embodiment 100'. System 100' may comprise one or more hosts 10' communicatively coupled to storage 52 via one or more links 44. One or more hosts 10' may comprise operative circuitry 102'. Circuitry 102' may comprise IC 68' coupled to memory 21 and accelerometer 170. IC 68' may comprise one or more host processors 13, ME 190, memory 50, controller 120, and VE 192. Although not shown in FIG. 3, IC 68' may comprise a graphics and memory controller hub whose operation may be similar to that of the graphics and memory controller hub that may be comprised in IC 66 in system 100. Unless stated to the contrary herein, the construction and operation of system 100' may be similar to the construction and operation of system 100.

Each mass storage device 150A . . . 150N may be comprised in one or more respective enclosures that may be separate from one or more enclosures in which the respective components of storage 52, one or more hosts 10, and/or one or more hosts 10' may be enclosed. Alternatively, one or more of the storage devices 150A . . . 150N may be comprised in one or more of the enclosures that may comprise the respective components of storage 52, one or more hosts 10, and/or one or more hosts 10'.

Figure 2:
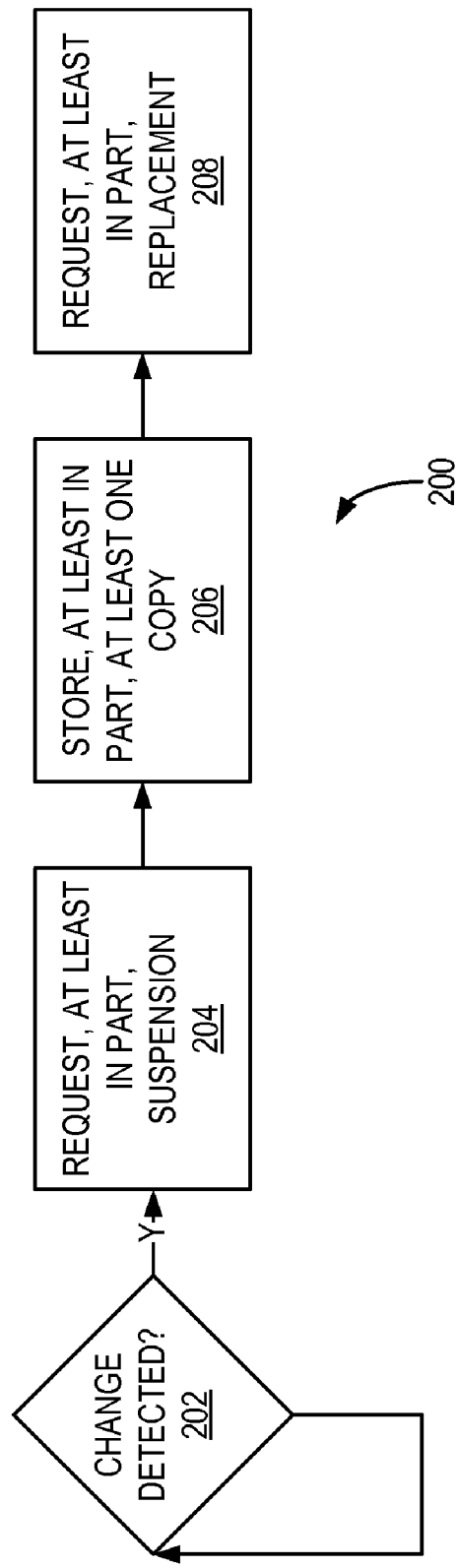
FIG. 2 illustrates operations that may be performed according to an embodiment.

Turning now to FIGS. 1 to 3, operations 200 that may be performed according to an embodiment will be described. Although these operations 200 will be described with specific reference to system 100, it should be understood that operations 200 may also be performed in system 100' without departing from this embodiment.

After, for example, a reset of one or more hosts 10, storage 52, and/or system 100, one or more cores 16A . . . 16N may issue to storage controller 120 one or more commands 132A . . . 132N that are intended for execution, at least in part, by one or more mass storage devices 150A . . . 150N of storage 52. Controller 120 may store the one or more commands 132A . . . 132N in one or more pending command queues 130 in controller 120. In this embodiment, a command may be considered "pending" if the command has been issued by a commanding entity but has not yet been completely executed (e.g., is currently unexecuted), at least in part, by the commanded entity. Controller 120 may issue these commands via one or more ports (not shown) of the storage 52 and/or one or more mass storage devices 150A . . . 150N to the storage 52 and/or one or more mass storage devices 150A . . . 150N for execution, at least in part by the storage 52 and/or one or more mass storage devices 150A . . . 150N. After storage 52 receives the one or more commands issued by the controller 120, storage 52 may place the received one or more commands 162A . . . 162N in one or more command queues 160 in storage 52.

After one or more commands 132A . . . 132N have been issued by one or more cores 16A . . . 16N, if accelerometer 170 detects (see operation 202 in FIG. 2) at least one change in the acceleration and/or orientation of the storage 52 (e.g., as a result, at least in part, of application of external force to the storage 52), accelerometer 170 may provide one or more interrupt signals and/or accelerometer data indicative, at least in part, of this detected change in acceleration and/or orientation to the ME 190. In response, at least in part, to this at least one detected change, ME 190 may examine, at least in part, one or more registers 140A in memory 50 to determine, at least in part, whether one or more values (e.g., one or more attribute bits) comprised in the one or more registers 140A have been set to indicate, at least in part, that VE 192 and/or controller 120 support implementation of remaining operations (e.g., operations 204, 206, and/or 208) comprised in operations 200. For example, these one or more attribute bits may be capable of being set once via burning of one or more fuse links (not shown), and registers 140A may comprise one or more registers that may be defined by the manufacturer/vendor according to the S-ATA and/or AHCI protocols. Alternatively or additionally, ME 190 may examine, at least in part, these one or more values of one or more registers 140A after the reset of system 100, one or more hosts 10, and/or storage 52. If ME 190 determines, at least in part, that these one or more values have not been set to indicate, at least in part, that VE 192 and/or controller 120 support implementation of these remaining operations, ME 190 may ignore the one or more interrupt signals and/or accelerometer data provided by accelerometer 170.

Conversely, if ME 190 determines, at least in part, that the one or more values comprised in one or more registers 140A have been set to indicate, at least in part, that VE 192 and/or controller 120 support implementation of remaining operations comprised in operations 200, ME 190 may determine, at least in part, based at least in part upon the one or more interrupt signals and/or accelerometer data whether to request suspension of one or more commands 132A . . . 132N currently stored in one or more pending command queues 130. For example, one or more policies may be set in whole or in part by a human operator of system 100, via e.g., the not shown user interface. Such policies may include one or more thresholds of one or more detected changes in acceleration and/or orientation and one or more associated responses to be carried out in response to such one or more detected changes. ME 190 may act in accordance, at least in part, with these one or more policies so as to permit these one or more policies to be implemented, at least in part. Additionally, ME 190 provide to the human user via the user interface status information indicating, at least in part, the detected change in (and/or current value of) the acceleration and/or orientation of storage 52. ME 190 may request and/or obtain from the accelerometer 170 information involved in determining, at least in part, the one or more detected changes and/or current values of the acceleration and/or orientation of storage 52.

If ME 190 determines, at least in part, that the one or more policies indicate, at least in part, that suspension of the one or more commands 132A . . . 132N is warranted, ME 190 may issue one or more requests to VE 192 requesting suspension of the one or more commands 132A . . . 132N, in response at least in part to the one or more detected changes in acceleration and/or orientation of the storage 52, as illustrated by operation 204 in FIG. 2. In response at least in part to these one or more requests from ME 190, VE 192 may issue one or more requests to controller 120 to suspend execution of one or more commands 132A . . . 132N. These one or more requests from VE 192 may involve VE 192 setting one or more values (e.g., one or more attribute bits) in one or more registers 140B in memory 50 that may indicate, for each respective port of storage 52, that (1) controller 120 is not to issue further commands and/or command frame information structures to storage 52 via that port, and/or (2) after the controller 120 determines, at least in part, that S-ATA and/or AHCI protocol idle condition exists for the respective port, controller 120 is to continue to maintain, at least in part, that idle condition by issuing to the storage 52 via the respective port one or more SYNC primitives and by failing to respond to (e.g., ignoring) one or more X_RDY primitives received from the storage 52 via the respective port. However, if the one or more values in one or more registers 140B are set while one or more data phases are in progress for one or more native command queue (NCQ) command and/or non-NCQ command involving the respective port, all of the data phases involving that command are to be completed prior to commencing the issuance of the SYNC primitives and/or ignoring of the X_RDY primitives by the controller 120. Controller 120 may act in accordance with the one or more requests received from VE 192.

Controller 120 may determine, at least in part, for each respective port, whether the suspension request (generated, at least in part, as a result of operation 204) has been completely executed, for the respective port, based upon (1) if one or more commands 132A . . . 132N are or comprise one or more non-NCQ commands, whether any data transaction involving the one or more non-NCQ commands is currently is in progress, (2) if the one or more commands 132A . . . 132N are or comprise one or more NCQ commands, whether the one or more NCQ commands are involved in any respective data transfer phases, and/or (3) whether a respective S-ATA and/or AHCI protocol idle condition exists. More specifically, in this embodiment, controller 120 may determine, at least in part, that the suspension request has been completely executed for the respective port, if, with respect to that respective port, (1) no data transactions involving the one or more non-NCQ commands are currently in progress, (2) no NCQ commands are currently involved in any respective data transfer phases, and (3) a respective S-ATA and/or AHCI protocol idle condition exists. If the controller 120 determines, at least in part, that the suspension request has been completely executed with respect to a respective port, the controller 120 may set one or more respective values (e.g., one or more respective attribute bits) in one or more registers 140N that may indicate, with respect to the respective port, that the suspension request has been satisfied.

After the one or more respective values in one or more registers 140N have been set by controller 120 to indicate that the suspension request has been satisfied with respect to all of the respective ports of storage 52, VE 192 may examine, at least in part, not shown registers (e.g., port control and/or active status registers) comprised in controller 120 to determine, at least in part, one or more pending commands 132A . . . 132N queued in one or more queues 130. Thereafter, as illustrated by operation 206 in FIG. 2, VE 192 may store (e.g., push onto a not shown stack) in memory 50, for later re-issuance by VE 192) one or more copies (indicated by numeral 180 in FIG. 1) of these one or more commands 132A . . . 132N. VE 192 then may reset (e.g., flush) the one or more commands 132A . . . 132N from one or more queues 130. VE 192 may accomplish this by, for example, clearing one or more attribute bits that have been previously set in the port control and/or active status registers to indicate that one or more commands 132A . . . 132N are no longer valid and/or active. After the one or more commands 132A . . . 132N have been flushed from one or more queues 130, VE 192 may set one or more attribute bits in one or more port control registers to indicate, at least in part, that one or more additional commands that may be subsequently issued and entered into one or more queues 130 may be valid. VE 192 then may request replacement in one or more queues 130 of the previously flushed one or more commands 132A . . . 132N with one or more other commands to park one or more heads 152A . . . 152N, as illustrated by operation 208 in FIG. 2.

For example, as part of an initial discovery and/or negotiation between controller 120 and storage 52, controller 120 may determine, at least in part, whether storage 52 and/or mass storage 150A . . . 150N are capable of executing a certain type of idle command (e.g., an "Idle Immediate with Unload" command according to S-ATA and/or AHCI protocol) that results in both (1) placing the storage 52 and/or mass storage 150A . . . 150N in idle mode and (2) unloading of one or more heads 152A . . . 152N, or whether the storage 52 and/or mass storage 150A . . . 150N are incapable of executing the foregoing type of idle command. If the controller 120 has determined, at least in part, that the storage 52 and/or mass storage 150A . . . 150N are capable of executing such an idle command, VE 192 may issue to controller 120, as part of operation 208, one or more requests requesting that one or more commands 132A . . . 132N previously flushed from one or more queues 130 be replaced in one or more queues 130 with one or more such idle commands, and may thereafter determine, at least in part, the status of the storage 52 and/or mass storage 150A . . . 150N (e.g., by issuing one or more S-ATA and/or AHCI protocol "Read_Log_Ext" commands specifying log page of 10 hexadecimal) if there had previously been either no commands pending or one or more pending NCQ commands. After completion of the one or more such idle commands, VE 192 may clear one or more values (e.g., error bits in a task file) to reset the status determination. In response, at least in part, to receipt of the one or more requests from VE 192, controller 120 may replace in one or more queues 130 the previously flushed one or more commands with the one or more such idle commands, and may issue these one or more such idle commands to the storage 52 and/or mass storage 150A . . . 150N. This may result in one or more pending commands (which may correspond, in whole or in part, to one or more commands 132A . . . 132N) 162A . . . 162N in one or more queues 160 being purged from one or more queues 160, and may also result in parking of one or more heads 152A . . . 152N. In this embodiment, a head may be considered "parked" if the head is located in a region of storage and/or mass storage in which there exists a relatively lower risk of loss of data stored in the storage and/or mass storage compared to at least one other location in which there may be a relatively higher risk of loss of data.

Conversely, if controller 120 has determined, at least in part, that the storage 52 and/or mass storage 150A . . . 150N are not capable of executing such an idle command, VE 192 may issue to controller 120, as part of operation 208, one or more requests requesting that one or more commands 132A . . . 132N previously flushed from one or more queues 130 be replaced in one or more queues 130 with one or more software reset and/or different idle commands (e.g., one or more S-ATA and/or AHCI S_RST and/or "Idle Immediate" commands) to place the storage 52 and/or mass storage 150A . . . 150N in idle mode and/or to park one or more heads 152A . . . 152N. In response, at least in part, to receipt of the one or more requests from VE 192, controller 120 may replace in one or more queues 130 the previously flushed one or more commands with the one or more software reset and/or other idle commands, and may issue these one or more software reset and/or other such idle commands to the storage 52 and/or mass storage 150A . . . 150N. This may result in one or more pending commands (which may correspond, in whole or in part, to one or more commands 132A . . . 132N) 162A . . . 162N in one or more queues 160 being purged from one or more queues 160, and may also result in parking of one or more heads 152A . . . 152N. In this embodiment, if storage 52 and/or controller 120 are operating in accordance with AHCI protocol, controller 120 may also issue to storage 52 and/or mass storage 150A . . . 150N one or more commands (e.g., one or more ACHI protocol command list CH[R]) to permit controller 120 to win arbitration between controller 120 and storage 52.

After storage 52 and/or mass storage 150A . . . 150N have executed the one or more commands issued by controller 120 as a result of operation 208, VE 192 may so inform ME 190. ME 190 may determine, at least in part, based at least in part upon data provided to ME 192 from accelerometer 170, whether the previously detected change in acceleration and/or orientation of the storage 52 has, subsequent to detection thereof, reached quiescence, at least in part (e.g., subsided below the one or more thresholds defined in the one or more policies). If ME 190 determines, at least in part, that such quiescence has occurred, at least in part, ME 190 may issue one or more requests to VE 192 that one or more commands 180 be retrieved (e.g., pushed) from the not shown stack in memory 50 and be entered into one or more queues 130. In response, at least in part, to these one or more requests, VE 192 may retrieve these one or more commands 180 from memory 50 and enter them into one or more queues 130, and VE 192 may set and/or reset appropriate values in one or more registers 140A and/or 140B to permit these one or more commands 180 to replace validly those most recently contained in one or more queues 130 as one or more active commands. Thereafter, these one or more commands 180 may be issue by controller 120 and executed by storage 52.

Thus, in an embodiment, an apparatus is provided that may include circuitry to, in response at least in part to detected change in at least one of acceleration and orientation of storage, request suspension of at least one command currently stored in at least one pending command queue that is intended for execution, at least in part, by the storage. The at least one command having been previously issued by the circuitry but being currently unexecuted, at least in part, by the storage. The circuitry also being to store, in response at least in part to the detected change, at least one copy of the at least one command for later re-issuance by the circuitry, and to request replacement of at least one command in the at least one queue with at least one other command to park at least one head of the storage.

Thus, in this embodiment, the at least one command may be suspended, stored for later execution, and replaced with at least one other command to park the at least one head of the storage. Advantageously, this may permit the at least one head to be parked faster than is possible in the prior art. This may reduce the risk of damage to the at least one head, other components, and/or data loss in this embodiment compared to the prior art.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Indeed, without departing from this embodiment, system 100 may include more or fewer than the elements shown in the Figures and described previously herein as being comprised system 100. Accordingly, the claims are intended to cover all such equivalents.

What is claimed is:

1. An apparatus comprising:
circuitry to, in response at least in part to detected change in at least one of acceleration and orientation of storage:
request suspension of at least one command currently stored in at least one pending command queue that is intended for execution, at least in part, by the storage, the at least one command being previously issued by the circuitry but currently unexecuted, at least in part, by the storage;
store at least one copy of the at least one command for later re-issuance by the circuitry; and
request replacement of at least one command in the at least one queue with at least one other command to park at least one head of the storage; and
after the suspension has been completed, the circuitry being also to maintain, at least in part, a communication protocol idle condition between the circuitry and the storage.

2. The apparatus of claim 1, wherein:
the circuitry also is to, in response at least in part to a subsequent quiescence, at least in part, of the detected change, retrieve the at least one copy of the at least one command and request entry of the at least one copy in the at least one queue.

3. The apparatus of claim 2, wherein:
the circuitry is also to determine whether the storage is capable of executing an idle command that results in both placing the storage in an idle mode and unloading of the at least one head;
if the storage is capable of executing the idle command, the circuitry is to request issuance of the idle command; and
if the storage is not capable of executing the idle command, the circuitry is to request issuance of software reset command followed by another idle command, the another idle command being to place the storage in the idle mode.

4. The apparatus of claim 3, wherein:
the circuitry is also to determine, at least in part, whether the suspension has been completed, based upon, at least in part:
if the at least one command is a non-native command queued command, whether any data transaction involving the at least one command is currently in progress; and
if the at least one command is a native command queued command, whether the at least one command is involved in a data transfer phase.

5. The apparatus of claim 4, wherein:
after the suspension has been completed, the circuitry is to maintain, at least in part, the communication protocol idle condition between the circuitry and the storage by issuing to the storage one or more SYNC primitives, and by failing to respond to one or more X_RDY primitives from the storage.

6. The apparatus of claim 5, wherein:
the circuitry is also to request, after the suspension has been completed, that the storage purge at least one pending command from at least one other command queue in the storage.

7. Computer-readable memory storing one or more instructions that when executed by a machine result in performance of operations comprising:
in response at least in part to detected change in at least one of acceleration and orientation of storage:
requesting, at least in part by circuitry, suspension of at least one command currently stored in at least one pending command queue that is intended for execution, at least in part, by the storage, the at least one command being previously issued by the circuitry but currently unexecuted, at least in part, by the storage;
storing, at least in part by the circuitry, at least one copy of the at least one command for later re-issuance by the circuitry; and
requesting, at least in part by the circuitry, replacement of at least one command in the at least one queue with at least one other command to park at least one head of the storage; and
after the suspension has been completed, the circuitry being also to maintain, at least in part, a communication protocol idle condition between the circuitry and the storage.

8. The memory of claim 7, wherein:
the circuitry also is to, in response at least in part to a subsequent quiescence, at least in part, of the detected change, retrieve the at least one copy of the at least one command and request entry of the at least one copy in the at least one queue.

9. The memory of claim 8, wherein:
the circuitry is also to determine whether the storage is capable of executing an idle command that results in both placing the storage in an idle mode and unloading of the at least one head;
if the storage is capable of executing the idle command, the circuitry is to request issuance of the idle command; and
if the storage is not capable of executing the idle command, the circuitry is to request issuance of software reset command followed by another idle command, the another idle command being to place the storage in the idle mode.

10. The memory of claim 9, wherein:
the circuitry is also to determine, at least in part, whether the suspension has been completed, based upon, at least in part:
if the at least one command is a non-native command queued command, whether any data transaction involving the at least one command is currently in progress; and
if the at least one command is a native command queued command, whether the at least one command is involved in a data transfer phase.

11. The memory of claim 10, wherein:
after the suspension has been completed, the circuitry is to maintain, at least in part, the communication protocol idle condition between the circuitry and the storage by issuing to the storage one or more SYNC primitives, and by failing to respond to one or more X_RDY primitives from the storage.

12. The memory of claim 11, wherein:
the circuitry is also to request, after the suspension has been completed, that the storage purge at least one pending command from at least one other command queue in the storage.

13. The apparatus of claim 1, wherein:
the circuitry comprises one or more host processors and a storage controller, the one or more host processors and the storage controller being comprised in an integrated circuit.

14. The memory of claim 7, wherein:
the circuitry comprises one or more host processors and a storage controller, the one or more host processors and the storage controller being comprised in an integrated circuit.

15. The memory of claim 7, wherein:
the circuitry is also to request issuance to the storage of a storage command that results in one or more of the following:
placing the storage in an idle mode,
unloading of the at least one head; and
flushing of at least one storage command queue that is in the storage.

* * * * *